United States Patent [19]

Rafi-Zadeh

[11] Patent Number: 4,856,841
[45] Date of Patent: Aug. 15, 1989

[54] ADJUSTABLE FOLDING ARM FOR VEHICLE COVER

[76] Inventor: Hassan Rafi-Zadeh, 5301 E. Mockingbird Ln., Paradise Valley, Ariz. 85253

[21] Appl. No.: 260,386

[22] Filed: Oct. 20, 1988

[51] Int. Cl.[4] .............................................. B60J 7/08
[52] U.S. Cl. .................................... 296/100; 296/26; 248/166; 248/225.1
[58] Field of Search .................. 296/100, 26, 27, 176, 296/172, 173; 248/225.1, 223.4, 224.3, 166

[56] References Cited

U.S. PATENT DOCUMENTS

| | | | |
|---|---|---|---|
| 3,155,423 | 11/1964 | Cripe | 296/100 |
| 3,649,073 | 3/1972 | Whittemore | 296/100 |
| 3,675,885 | 7/1972 | Shute | 296/100 |
| 3,765,716 | 10/1973 | Von Crompel | 296/100 |
| 4,613,181 | 9/1986 | Rafi-Zadeh | 296/100 |
| 4,673,209 | 6/1987 | Rafi-Zadeh | 296/100 |

*Primary Examiner*—Robert R. Song
*Attorney, Agent, or Firm*—Tod R. Nissle

[57] ABSTRACT

A cover assembly for the bed of a pickup truck includes a rigid cover which is mounted on the bed by a plurality of spring-loaded arms which allow the cover to be vertically moved between a stored, closed position and an open, extended position. The folding arms include adjustment means which permits the orientation of the arms in the closed position to be adjusted to a selected orientation. Counteracting springs are utilized to facilitate deployment of the cover assembly to the open, extended position.

4 Claims, 3 Drawing Sheets

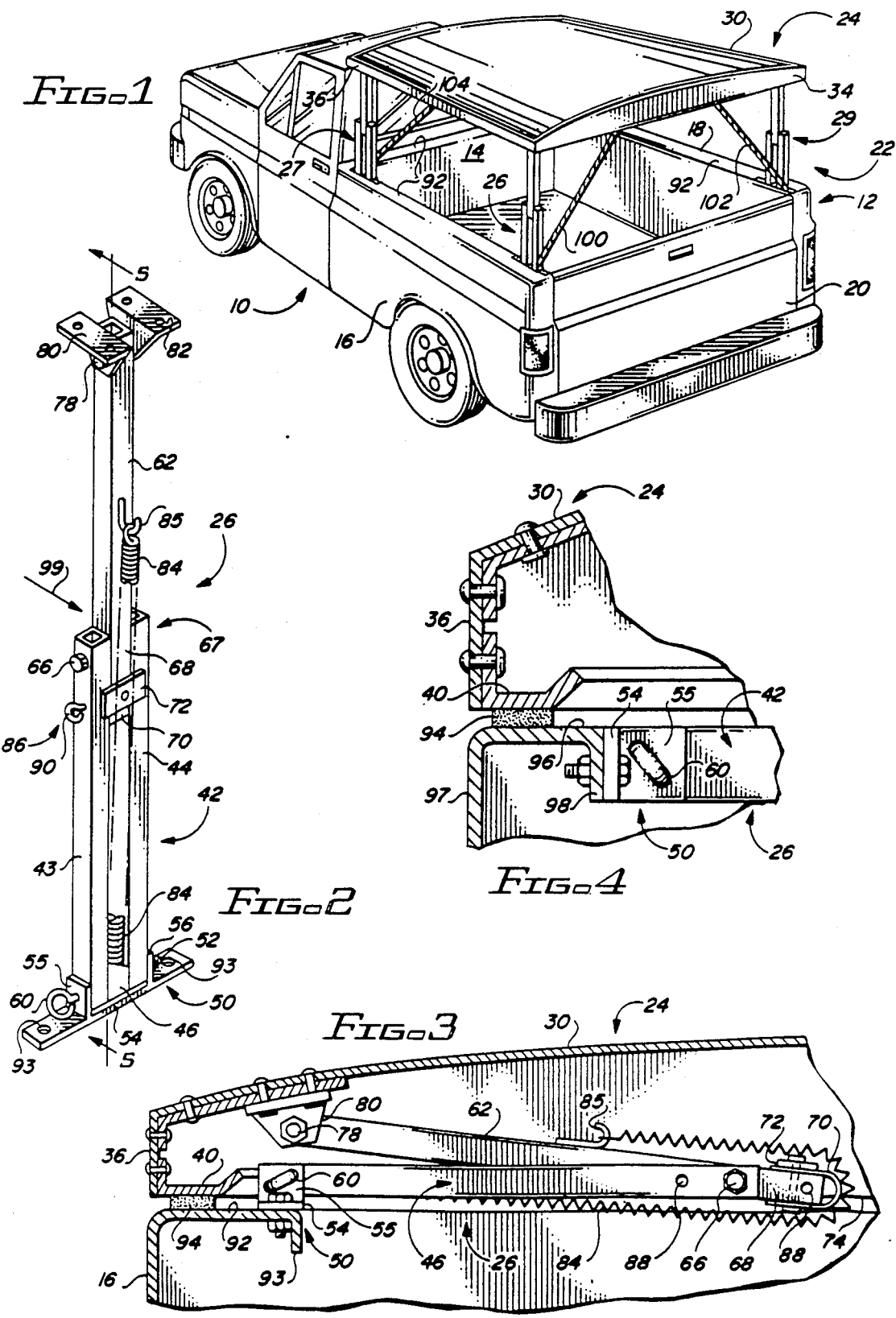

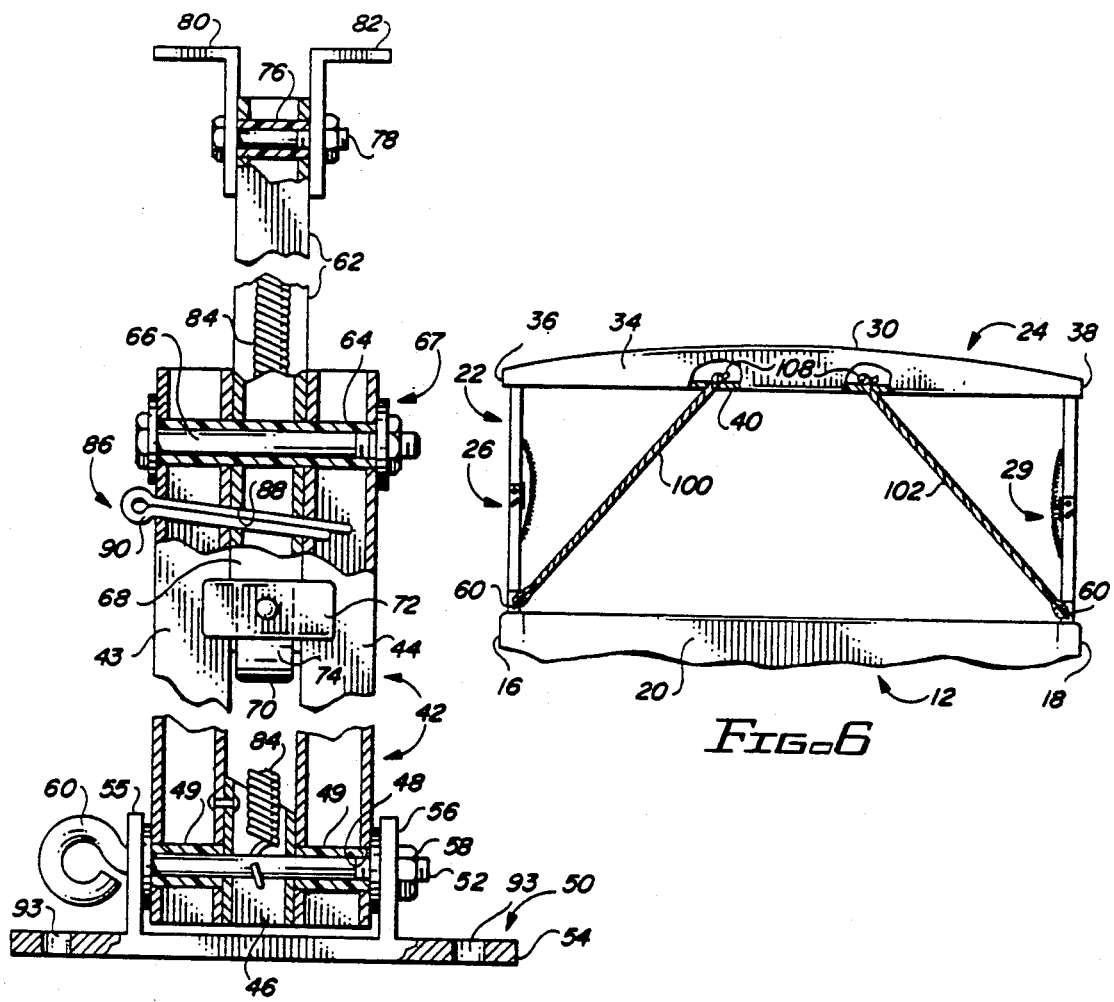
FIG-5
FIG-6
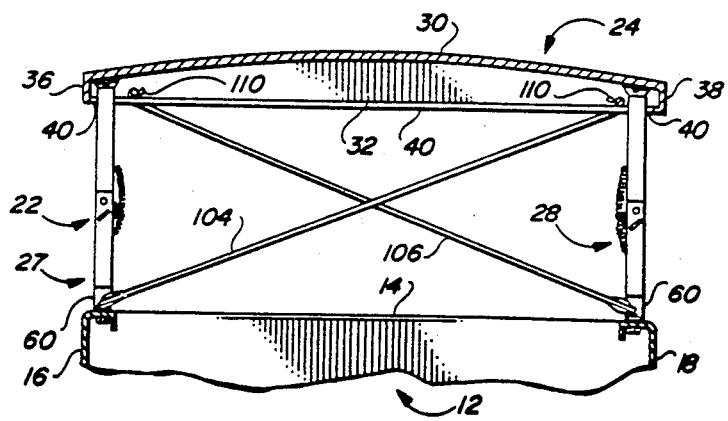
FIG-7

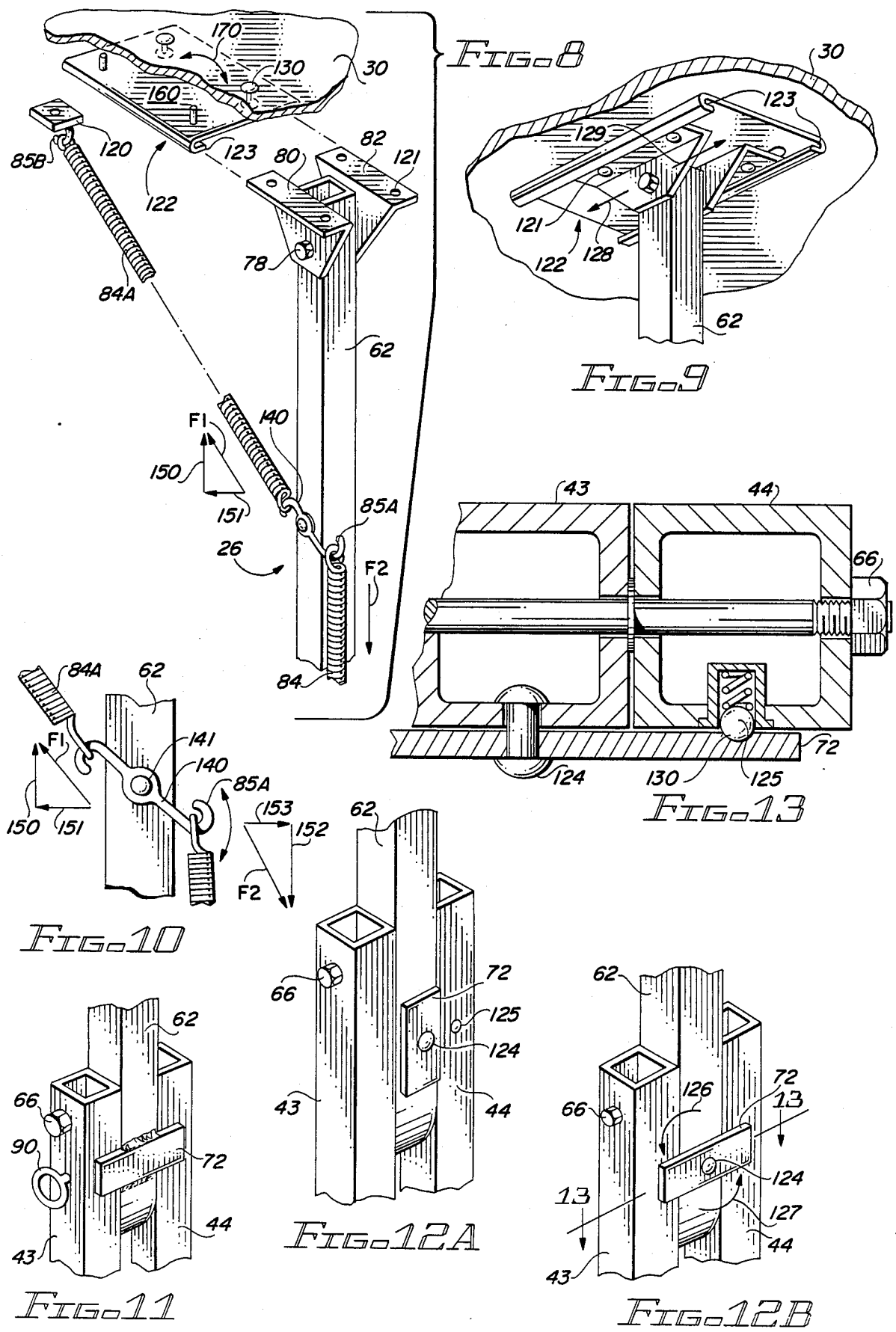

ADJUSTABLE FOLDING ARM FOR VEHICLE COVER

This invention relates to a cover for the bed of a pickup truck.

More particularly, the invention relates to a pickup truck bed cover which is attached to a plurality of folding arms which connect the cover to the bed of the truck and which permit the cover to be stored in a closed, stored position over the truck bed and permit the cover to be raised upwardly away from the truck bed to an open, elevated position In a further respect, the invention relates to a pickup truck bed cover of the type described which facilitates installation of the cover on pickup trucks having beds of varying size and which reduces the muscular strength required to raise the cover from the truck bed.

The cover assemblies which are described in my earlier issued U.S. Pat. Nos. 4,673,209, 4,613,181 and 4,469,364 each provides improved means for equipping the bed of a pickup truck with a cover which can be maintained against the truck bed or which can be readily raised to a selected elevated position above the bed of the truck. Although the various improvements described in these earlier issued patents have been important, two problems have continued, at least in part, to exist. One of these problems is minimizing the strength required to lift the cover from the stored to the elevated position. While the tension spring 84 in my U.S. Pat. No. 4,673,209 facilitates raising of the cover, reducing the physical strength required to raise the cover is advantageous, especially for women utilizing the cover. The other problem is adapting the cover assembly for ready installation on any of a plurality of pickup trucks each having different sized beds and different sized ledges circumscribing the beds. In my U.S. Pat. No. 4,673,209, a one piece mounting bracket 50 is described which enables the cover to be attached either to the top or to the inside edge of the bed of a pickup truck. Even when this mounting bracket is utilized, the orientation of the folding arm in the closed, stored position can alter appreciably depending on the dimensions of the truck bed on which the cover assembly is installed. For example, in FIG. 3 of the drawings, the folded arm 26 is shown in its desired generally horizontal orientation when the cover assembly is in the closed storage position. Insuring that the arm is in the position of FIG. 3 when the cover is closed is important. If the folded arm tilts downwardly toward the bed of the pickup truck, access to the bed is impeded when the cover assembly is in the closed, stored position. If the folded arm tilts upwardly from the position of FIG. 3, it can impede the proper opening and closing of the cover. Moving the point of attachment of mounting bracket 50 laterally alters the orientation of the folded arm when the cover is in the closed position.

Accordingly, it would be highly desirable to provide a method and apparatus for adjusting the folded orientation of an arm 26 after the mounting bracket 50 of the arm is attached to the bed of a pickup truck.

It would also be highly desirable to provide an improved cover assembly for a pickup truck bed which facilitates lifting of the cover from the closed storage position to the open position.

Therefore, it is a principal object of the invention to provide an improved cover for the bed of a pickup truck.

Another object of the invention is to provide an improved pickup truck bed cover of the type including a plurality of folding arms attached to the ledge of the bed to permit the cover to be lifted from a closed, stored position against the bed ledge to a raised position with the arms supporting the cover above the truck bed.

A further object of the invention is to provide an improved pickup truck bed cover of the type described which enables the position of the folding arms relative to the cover when the cover is in the closed, stored position to be readily adjusted after the lower end of each folding arm has been secured to the upper ledge of the wall circumscribing the bed of the truck.

Still another object of the invention is to provide an improved pickup truck bed cover of the type described which minimizes the physical strength required to raise the cover from the stored to the raised position.

These and other, further and more specific objects and advantages of the invention will be apparent to those skilled in the art from the following detailed description thereof, taken in conjunction with the drawings, in which:

FIG. 1 is a perspective view illustrating a pickup truck having the cover assembly of the invention installed thereon;

FIG. 2 is a perspective view illustrating one of the folding arms of the cover assembly of FIG. 1;

FIG. 3 is a section view of the cover assembly of FIG. 1 illustrating one of the arms of FIG. 2 in the folded position when the cover assembly of FIG. 2 is lowered to a closed storage position adjacent the ledge of the bed of the pickup truck;

FIG. 4 is a section view of the cover assembly of FIG. 1 illustrating an alternate method of attaching the arm of FIG. 2 to the upper ledge of the wall of the bed of the pickup truck;

FIG. 5 is a section view of the folding arm of FIG. 2 taken along section line 5—5 thereof;

FIG. 6 is a rear elevation view of the raised cover assembly of FIG. 1 illustrating construction details thereof;

FIG. 7 is a front elevation view of the cover assembly of FIG. 1 illustrating an alternate embodiment thereof;

FIG. 8 is a perspective view illustrating an alternate embodiment of the invention;

FIG. 9 is a perspective view illustrating the mode of operation of the embodiment of the invention illustrated in FIG. 8;

FIG. 10 is a side view of a portion of the apparatus of FIG. 8 illustrating opposing tension springs utilized to move a folding arm from the closed stored position illustrated in FIG. 3 to the open extended position illustrated in FIGS. 2, 8 and 9;

FIG. 11 is a perspective view of the stop plate utilized on the arm assembly of FIG. 2;

FIGS. 12A and 12B are perspective views illustrating an alternate embodiment of the stop plate of FIG. 11; and, FIG. 13 is a section view of the stop plate assembly of FIG. 12B taken along section line 13—13 thereof.

Briefly, in accordance with my invention, I provide a vertically extendible cover assembly for use on the bed of a pickup truck, comprising, in combination, a rigid cover; a plurality of folding arms each having a lower base leg and an upper extending leg, said legs each including an upper end and a lower end, the upper end of the base leg being pivotally attached to the lower end of the extending leg; bracket means attached to each of the lower ends of the base legs to attach the lower end to the upper ledge means of the pickup truck bed; mounting means for securing each of the upper ends of the extending leg to the cover, the mounting means including a foot pivotally attached to the upper end of the extending leg, sleeve means fixedly attached to the cover to slidably receive the foot to permit the foot to be slidably laterally positioned at a selected position in the sleeve, and attachment means for fixedly securing the foot in the sleeve in the selected position, each of the folding arms being movable between first and second operative positions when the attachment means fixedly secures the foot in the selected position. The first operative folded position of the folding arm is with the cover in a lowered position on the pickup bed and with the leg extending from the ledge means inwardly into the pickup truck bed. The second operative folded position of a folding arm is an unfolded extended position with the cover raised from the pickup truck bed and the legs of the arm extending upwardly from the ledge mean to the cover. The cover assembly can include a first tension spring and a second tension spring. The first tension spring has one end attached to the upper leg intermediate the upper and lower ends thereof, and a second end attached to one of the first group consisting of the lower end of the base leg, the bracket means, and the pickup truck bed. The second tension spring has one end attached to the upper leg intermediate the upper and lower ends thereof, and has a second end attached to one of the second group consisting of the mounting means and the cover. When the arm is in the first operative position, the first spring extends from the upper leg inwardly into the bed, around the pivot point, and from the pivot point outwardly to said one of the first group. The second spring generates forces which act in directions opposing forces generated by the first spring and generates forces which act against the pivot point to facilitate movement of the arm from the first to the second operative position.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a pickup truck 10 including bed 12. The bed 12 is provided with front panel 14, opposed side panels 16 and 18 and tail gate 20. In FIG. 1 the cover assembly of the invention is mounted on bed 12. The cover assembly is indicated by reference character 22. Cover assembly 22 includes a rigid cover structure 24 and four spring-loaded folding arms 26, 27, 28 and 29. Arms 26 to 29 connect cover 24 to bed 12.

Rigid cover structure 24 can be rectangular or any other desired configuration. Cover 24 includes top panel 30 having a depending front panel 32, depending back panel 34, and opposed side panels 36 and 38. Each of panels 32, 34, 36 and 38 has a lip 40 formed on its lower end to extend inwardly from the periphery of cover 24. These lips 40 may be formed by attaching a right angle member in the manner shown in FIGS. 3 and 4.

In the presently preferred embodiment of the invention, each arm 26, 27, 28 and 29 is identical to the other of said arms. Each arm 26—29 can have a structure different from the other arms 26—29.

Folding arm 26 is illustrated in FIGS. 2, 3 and 5 and includes a bifurcated base leg 42 having coextending spaced apart tines or legs 43 and 44 which are interconnected at their aligned lower ends by a tubular spacer 46. The aligned lower ends of the tines or legs 43 and 44 and the spacer 46 are provided with a transverse aperture 48 having suitable bushings 49 therein. A special one piece mounting bracket 50 is pivotally connected to the lower end of base leg 42 by means of a pivot pin 52. Bracket 50 has a planar plate 54 having a spaced apart pair of lugs 55 and 56 extending normally therefrom and having apertures formed therethrough. The lower end of the base leg 42 is located between the lugs 55 and 56 and the pivot pin 52 passes through the aligned apertures of the lugs and the transverse aperture 48 of the base leg so as to provide a pivot joint. The pivot pin 52 has a threaded end and a suitable nut 58 is threadingly attached thereto to hold the pivot pin in place. Also, the pivot pin 52 has a ring-shaped head 60 at its opposite end.

The aligned opposite upper ends of tines 43 and 44 have an extending leg 62 mounted therebetween. An aperture is formed transversely through the upper ends of tines 43, 44 and through extending leg 62. Bushing 64 is mounted in the aperture. A pivot pin or bolt 66 extends through bushing 64 and is secured in place by a suitable nut. In this manner, folding arm 26 is provided with a pivot joint means 64 between the base leg 42 and the extending leg 62.

Extending leg 62 has a lower end portion 68 which extends from the pivot joint 67 downwardly between the tines 43 an 44 of the base leg 42. An arcuate bearing head 70 is mounted on the lowermost end of the lower end portion 68 of extending leg 62, and a transverse stop plate 72 is mounted in spaced relationship with that lowermost end. The transverse stop plate 72 is configured to extend laterally and oppositely beyond the opposite sides of the extending leg 62 so as to be moved into bearing engagement with tines 43 and 44 when the folding arm 26 is moved from its folding position to its extended position and to thereby prevent movement beyond its extended position. The arcuate bearing head 70 extends axially from the end of the extending arm 62 to provide a semi-circular curved surface 74 on the end of the extending arm.

A suitable bushing 76 is disposed in a transverse aperture formed in the upper end of the extending arm 62 and a suitable nut and bolt assembly 78 is mounted in the bushing to hold a pair of right angle mounting flanges 80 and 82 on the opposite sides of the extending arm 62. The mounting flanges 80, 82 are thereby pivotally carried on the upper end of the extending arm 62 and are employed for connecting the folding arm 26 to cover structure 24.

Bushings 49, 64 and 76 can be formed of a self-lubricating material such as nylon.

Spring 84 urges arm 26 to its extended position. The lower end of spring 84 is attached in tubular space 46. For example, in FIG. 5, the lower end of spring 84 is hooked to the shank of pivot pin 52. The upper end of spring 84 is attached to leg 62 intermediate the ends thereof by hook 85. Spring 84 extends between leg 42 and leg 62 and has an intermediate portion in bearing engagement with the transverse stop plate 72 when the folding arm 26 is in either its extended position or its folded position.

Locking means 86 is provided for selectively locking the folding arm 26 in its extended position. As shown in FIG. 5, a blind aperture 88 is formed through tine 43, through the lower end 68 of the extending leg 62, and half way through tine 44. When folding arm 26 is extended, the various holes of blind aperture 88 are in alignment and the aperture slopes downwardly at an acute angle with respect to the flange 57 of the one piece mounting flange 50. Cotter pin 90 can be inserted in aperture 88 to lock arm 26 in the extended position.

In FIG. 3, bracket 50 or arm 26 is mounted on the innermost edge of upper horizontal ledge 92 of side panel 16 of bed 12. Bracket 50 is mounted with bolts or other means. Planar plate 54 of bracket 50 includes apertures 93 at each end to facilitate the mounting of bracket 50 with bolts. In FIG. 3, lugs 55 and 56 extend upwardly from bracket 50. The orientation of bracket 50 in FIG. 3 is preferred on full size pickup trucks.

When cover assembly 22 is mounted in mini-pickup trucks, flange 50 is attache in the manner shown in FIG. 4. Flange 50 is attached to inner vertical edge of upper ledge 96 of the side panel 97 of the mini-pickup truck by being bolted to lip 98.

The right angle mounting flanges 80 and 82 of arm 26 are connected to the underside of top panel 30 of cover 24 by rivets as shown in FIG. 3.

Cover assembly 22 includes means for stabilizing the cover in a direction transverse to the longitudinal dimension of truck 12. This transverse stabilizing means comprises a first pair of stringers 100 and 102 at the rear end of the cover assembly and a second pair of stringers 104 and 106 at the front end thereof. In FIG. 6, the first pair of stringers 100 and 102 have their lower ends attached to heads 60 of pivot pins 52 of folding arms 26 and 29, respectively. The upper ends of stringers 100 and 102 pass through apertures formed through lip 40 of panel 34 of cover 24. The upper ends of stringers 100, 102 are knotted 103 or otherwise secured in place.

In FIG. 7, the second pair of stringers 104 and 106 have their lower ends attached to heads 60 of pins 52 of arms 27, 28, respectively. The upper ends of stringers 104 and 106 are attached to panel 32. The upper ends of stringers 104 and 106 pass through apertures in lip 40 of panel 32 and are knotted 110 or otherwise secured.

Operation of the cover assembly of FIGS. 1 to 7 is known to those of skill in the art and is described in my issued U.S. Pat. No. 4,673,209, which is incorporated herein by reference.

In the embodiment of the invention illustrated in FIGS. 8 and 9, a sleeve 122 is attached to panel 30 with rivets 130 or other fastening means. Sleeve 122 is attached to the underside of panel 30 in the general location at which flanges 80 and 82 are shown attached in FIGS. 1 and 3. Inturned U-shaped lips 123 of sleeve 122 are shaped and dimensioned to slidably receive flanges 80 and 82. Flanges 80 and 82 comprise a foot attached to the upper end of extending arm 62. Flanges 80 and 82 are pivotally attached to arm 62 by bolt 78 or other fastening means. As illustrated in FIG. 9, the foot can be slidably laterally adjusted in the directions indicated by arrows 128 and 129 to a selected position in sleeve 122. The directions indicated by arrows 128 and 129 are generally perpendicular to the longitudinal axis of truck 10. Once flanges 80 and 82 are adjusted to the selected position, bolts or rivets and can inserted through apertures 121 in flanges 80 and 82 to secure flanges 80 and 82 to panel 30. Utilization of the apparatus of FIGS. 8 and 9 is important because it permits the folded horizontal orientation of arm 26, illustrated in FIG. 3, to be readily adjusted upwardly and downwardly after bracket 50 has been secured to the upper ledge of the bed of a pickup truck. This orientation is important because when the arms 43, 44, 62 are orientated downwardly from the position of the arms shown in FIG. 3, then legs 43, 44 and 62 interfere with use of the bed of the truck to store materials. When the legs 43, 44 and 62 angle upwardly from the position illustrated in FIG. 3, then they may contact panel 30 and interfere with opening and closing of the cover 24. As would be appreciated by those of skill in the art, once mounting bracket 50 is secured to the ledge of the bed of a pickup truck, adjustment of flanges 80 and 82 in the directions indicated by arrows 128, 129 will determine the orientation of the legs of arm 26 when arm 26 is in the folded position of FIG. 3.

In use, the mounting bracket 50 for each arm 26 to 9 is secured to the ledge of the bed of a pickup truck in the manner illustrated in FIG. 3 or in FIG. 4. The sleeves 22 for the flanges 80, 82 on each of arms 26 to 29 are then attached to the underside of panel 30 at the corners thereof. The flanges for each arm 26 to 29 are slidably inserted the appropriate sleeve 122 and moved to a selected position. Flanges 80 and 82 are temporarily secured in fixed position in sleeve 122. Cover 24 is lowered to the closed position of FIG. 3 and the orientation of legs 62, 43, 44 is checked to insure each arm is in the preferred horizontal orientation. This preferred orientation is typically the orientation shown in FIG. 3, but can vary. If the orientation of the arm 26 to 29 is not correct, cover panel 30 is raised to the position of FIG. 1, flanges 80 and 82 are loosened and slidably adjusted in the direction of arrow 128 and/or 129 to a new selected position. Flanges 80 and 82 are again temporarily secured in fixed position in sleeve 122. The cover assembly is then lowered to the closed position of FIG. 3 and the orientation of the legs 62, 43, 44 of each arm 26 to 29 is checked. This procedure is repeated until the orientation of each arm is acceptable. Once the orientation of an arm 26 to is acceptable, flanges 80 and 82 are fixedly secured to sleeve 122 and panel 30.

In FIG. 8 anchor 120 is attached to panel 30, panel 36, or sleeve 122 such that the longitudinal vertical axis of leg 62, the vertical longitudinal axis of spring 84, and the sloped longitudinal axis of spring 84A each generally lie in a common vertical plane. The lower end of tension spring 84A is connected to S-hook unit 140. The upper end of spring 84A is connected to hook 85B of anchor 120. The upper end of spring 84 is connected to hook 85A of S-hook 140. Although not seen in FIGS. 8 and 9, the structure of legs 43 and 44, bracket 50, plate 72, bolt 66, pin 90 etc. is identical to the structure shown in FIG. 2. In other words, the lower structure of arm 26 not shown in FIGS. 8 and 9 is shown in FIG. 2.

Spring 84A is tensioned when the arm 26 is in the closed position of FIG. 3 or is in the open position of FIGS. 8 and 2. Spring 84A produces a force F1 on unit 140 and leg 62. F1 includes force components 150 and 151. When arm 26 is in the open extended position of FIG. 8, spring 84 produces force F2 acting on unit 140 and leg 62. Force F2 includes components 153 and 152. Force 151 counteracts and is significantly greater than force 153. Force 150 counteracts force 152. Unit 140 is pivotally attached to leg 62 by pin 141. If desired, hooks 85 or other means can be used in place of S-unit 140 to secure springs 84 and 84A to leg 62.

In FIG. 10, arm 26 is in the extended, open position and the magnitude of force 151 is larger than the magnitude of force 153. When arm 26 is in the closed position of FIG. 3, then the magnitude of force 153 is larger than that of force 151. In FIGS. 8 and 10, the magnitude of vertical force component 150 is typically greater than the magnitude of horizontal force component 151. When the arm 26 is in the closed position of FIG. 3, the magnitude of force component 151 is greater than the magnitude of force component 150. In FIG. 3, spring 84 extends around bearing head 70 and imparts a horizontal inward force against head 70 which tends to force head 70 toward bracket 50. Consequently, when a user lifts panel member 36 upwardly to raise cover 24 from the stored position of FIG. 3 to the open position of FIG. 1, forces 150, 151 and the horizontal inward force acting on head 70 tend to force arm 26 inwardly and upwardly from the stored position of FIG. 3.

Since spring 84A counteracts spring 84, the utilization of spring 84A might, on initial consideration, not appear to facilitate operation of the cover assembly of the invention. Spring 84A does, however, significantly reduce the strength required to upwardly lift cover 24 from the stored position of FIG. 3. Force 150 also assists in stabilizing arm 26 in the open, extended position. As a result, even though the forces generated by spring 84A counteract forces 153 and 152 generated by spring 84, such counteracting forces improve and do not adversely affect operation of the cover assembly.

In FIGS. 2 and 11, stop plate 72 is fixedly secured to leg 62. As illustrated in FIGS. 12 and 13, plate 72 can be pivotally attached to leg 62 with a fastener 124. Aperture 130 formed on the inner surface of plate 72 receives spring loaded bearing 125 to movably maintain plate 72 in the position shown in FIG. 12B. Plate 72 can be rotated about fastener 124 in the directions indicated by arrows 126 and Rigid cover structure 24 can comprise a unitary piece of plastic or metal, can comprise a wood frame or other frame covered by canvas, or can comprise any other structure which generally maintains the distance between arms 26 to 29 when the cover is in the raised, deployed position.

Sleeve 122 can be initially rotatably attached to cover 30 with a rivet or other fastener which extends through sleeve 122 at point 160 and permits sleeve 122 to be rotated about point 160 in the directions indicated by arrows 170. After the orientation of sleeve 122 on cover 30 is selected by rotating sleeve 122 about point 160 to a selected position, rivets 130 or other fastening means can be used to secure sleeve 122 in fixed position.

Having described my invention in such terms as to enable those skilled in the art to understand and practice it, and having identified the presently preferred embodiments thereof,

I claim:

1. A vertically extendible cover assembly for use on the bed of a pickup truck, comprising, in combination.
    (a) a rigid cover;
    (b) a plurality of folding arms each having a lower base leg and an upper extending leg, said legs each including an upper end and a lower end, said upper end of said base leg being pivotally attached to said lower end of said extending leg;
    (c) bracket means attached to each of said lower ends of said base legs to attach said lower end to the upper ledge means of the pickup truck bed;
    (d) mounting means for securing each of said upper ends of said extending leg to said cover, said mounting means including
        (i) a foot pivotally attached to said upper end of said extending leg,
        (ii) sleeve means fixedly attached to said cover to slidably receive said foot to permit said foot to be slidably laterally positioned at a selected position in said sleeve; and,
        (iii) attachment means for fixedly securing said foot in said sleeve in said selected position;
    each of said folding arms being movable between first and second operative positions when said attachment means fixedly secures said foot in said selected position;
    (e) a first operative folded position with said cover in a lowered position on said pickup bed and with said legs extending from said ledge means inwardly into said pickup truck bed, and
    (f) a second operative unfolded extended position with said cover raised from said pickup truck bed and said legs extending from said ledge means upwardly to said cover.

2. The cover assembly of claim 1 including
    (a) a first tension spring having
        (i) one end attached to said upper leg intermediate said upper and lower ends thereof, and,
        (ii) a second end attached to one of the first group consisting of
            said lower end of said base leg,
            said bracket means, and
            said pickup truck bed; and,
    (b) a second tension spring having
        (i) one end attached to said upper leg intermediate said upper and lower ends thereof, and,
        (ii) a second end attached to one of the second group consisting of
            said mounting means, and
            said cover;
        said first spring, when said arm is in said first operative position, extending from said upper leg inwardly into said bed, around said pivot point, and from said pivot point outwardly to said one of said first group;
    said second spring generating
        forces which act in directions opposing forces generated by said first spring, and
        forces which act against said pivot point to facilitate movement of said arm from said first to said second operative position.

3. The cover assembly of claim 2 wherein said springs are attached to a common member pivotally mounted on said extending leg.

4. The cover assembly of claim 3 wherein a stop plate is pivotally attached to said lower end of said extending leg to contact said base leg when said arm is in said second operative position.

* * * * *